(12) United States Patent
Terayama et al.

(10) Patent No.: US 12,358,417 B2
(45) Date of Patent: Jul. 15, 2025

(54) LAMP SYSTEM

(71) Applicant: Koito Manufacturing Co., Ltd., Tokyo (JP)

(72) Inventors: Takashi Terayama, Shizuoka (JP); Mitsuharu Mano, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 18/666,082

(22) Filed: May 16, 2024

(65) Prior Publication Data

US 2024/0300403 A1 Sep. 12, 2024

Related U.S. Application Data

(63) Continuation of application No. PCT/JP2022/042448, filed on Nov. 15, 2022.

(30) Foreign Application Priority Data

Nov. 17, 2021 (JP) .................. 2021-187326

(51) Int. Cl.
*B60Q 1/115* (2006.01)
*B60Q 1/14* (2006.01)

(52) U.S. Cl.
CPC ............ *B60Q 1/115* (2013.01); *B60Q 1/1423* (2013.01); *B60Q 2300/056* (2013.01); *B60Q 2300/132* (2013.01); *B60Q 2300/324* (2013.01)

(58) Field of Classification Search
CPC ........ B60Q 1/14; B60Q 1/143; B60Q 1/1423; B60Q 1/115; B60Q 1/085
See application file for complete search history.

(56) References Cited

U.S. PATENT DOCUMENTS

| | | | | |
|---|---|---|---|---|
| 6,193,398 B1* | 2/2001 | Okuchi | .................. | B60Q 1/115 |
| | | | | 362/465 |
| 6,229,263 B1* | 5/2001 | Izawa | ...................... | B60Q 1/18 |
| | | | | 315/80 |
| 6,480,806 B1* | 11/2002 | Bilz | ....................... | B60Q 1/115 |
| | | | | 362/465 |
| 10,946,788 B2 | 3/2021 | Osada et al. | | |
| 2013/0258689 A1 | 10/2013 | Takahira et al. | | |

(Continued)

FOREIGN PATENT DOCUMENTS

DE 10351832 A1 6/2005
JP 2010143424 A 7/2010

(Continued)

OTHER PUBLICATIONS

English Translation of JP 2013235742 (Year: 2013).*

(Continued)

*Primary Examiner* — Zheng Song
(74) *Attorney, Agent, or Firm* — BUCHANAN, INGERSOLL & ROONEY PC

(57) ABSTRACT

A high-definition lamp unit emits lamp beam with a light distribution containing a cut-off line. A sensor is provided to detect a dynamic component of a pitch angle of a vehicle body during travel. A controller shifts the level of a cut-off line of the light distribution up and down, with reference to a predetermined level defined as a base, corresponding to the dynamic component of the pitch angle of the vehicle body.

12 Claims, 12 Drawing Sheets

(56) References Cited

U.S. PATENT DOCUMENTS

| | | | |
|---|---|---|---|
| 2014/0175978 A1 | 6/2014 | Kobayashi | |
| 2014/0301094 A1* | 10/2014 | Ehlgen | B60Q 1/115 362/466 |
| 2015/0051797 A1* | 2/2015 | Ehlgen | B60Q 1/085 701/49 |
| 2015/0151669 A1* | 6/2015 | Meisner | G06V 20/584 701/49 |
| 2016/0034770 A1* | 2/2016 | Peterson | B60Q 1/143 382/104 |

FOREIGN PATENT DOCUMENTS

| | | |
|---|---|---|
| JP | 2011-162153 A | 8/2011 |
| JP | 2013054956 A | 3/2013 |
| JP | 2013235742 A | 11/2013 |
| JP | 2019116232 A | 7/2019 |
| WO | 2016/013419 A1 | 1/2016 |
| WO | 2020031255 A1 | 2/2020 |

OTHER PUBLICATIONS

English Translation of WO 2020031255 (Year: 2020).*

International Preliminary Report on Patentability and Written Opinion of the International Searching Authority (Forms PCT/IB/373 and PCT/ISA/237) issued on May 2, 2024, by the International Bureau of WIPO, in corresponding International Application No. PCT/JP2022/042448, with English translation. (10 pages).

International Search Report (Form PCT/ISA/210) issued on Feb. 7, 2023, by the Japanese Patent Office in corresponding International Application No. PCT/JP2022/042448, with English translation. (6 pages).

Extended European Search Report issued on Feb. 19, 2025, in corresponding European Patent Application No. 22895610.8. (8 pages).

* cited by examiner

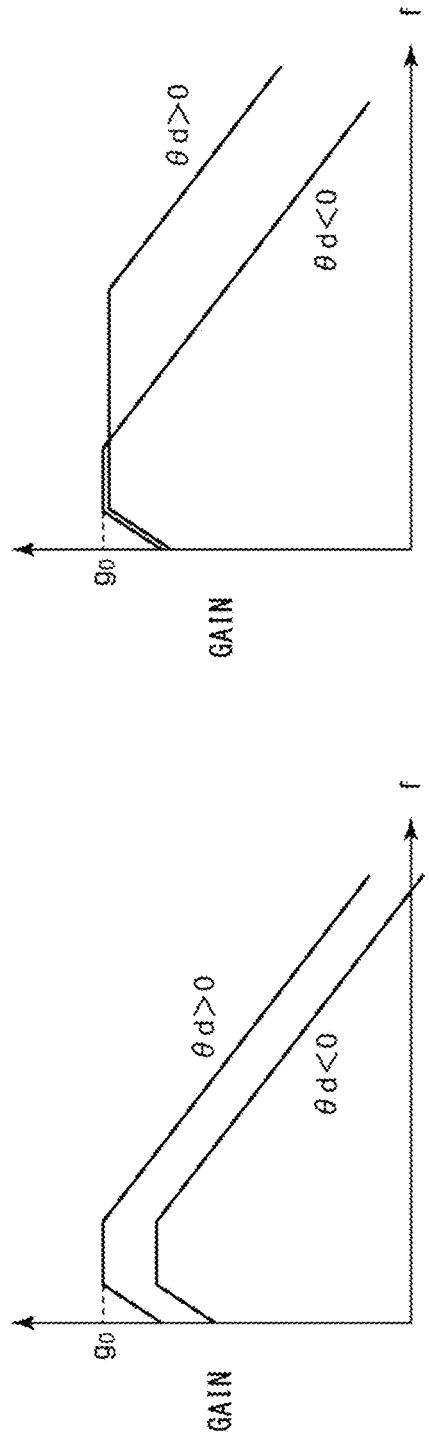
FIG. 11A
FIG. 11B
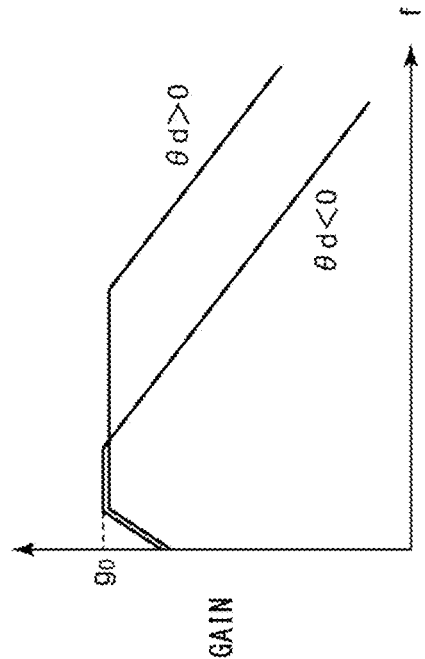
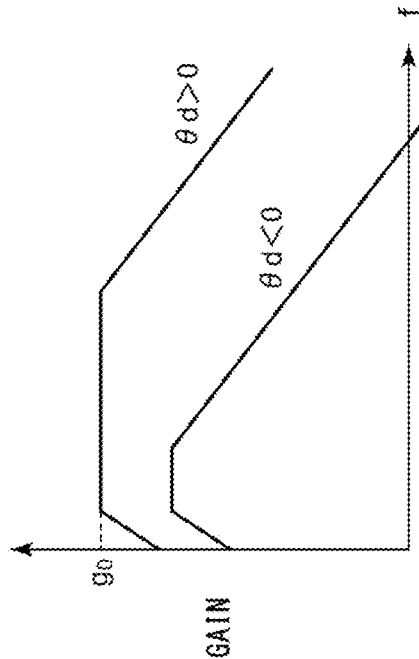
FIG. 11C
FIG. 11D
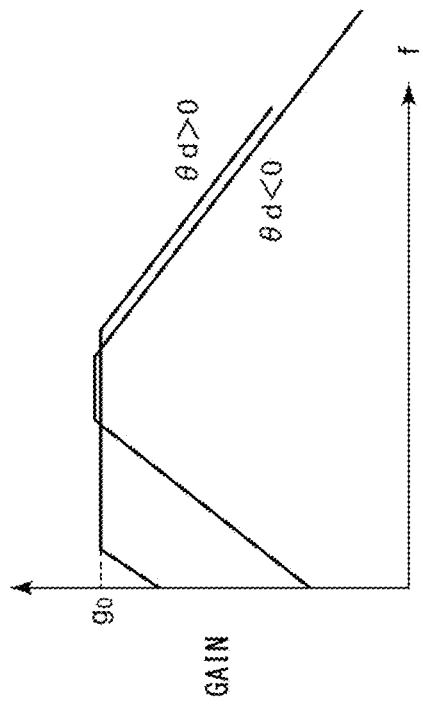

LAMP SYSTEM

BACKGROUND

1. Technical Field

The present disclosure relates to a vehicle lamp.

2. Description of the Related Art

Light distribution pattern of vehicle headlamp is regulated by law, so as not to cause glare to a nearby traffic participant. A vehicle body will have front-rear inclination that varies depending on the number of passengers and the weight of baggage. This varies inclination of the optical axis of the headlamp relative to the road face (ground face), whereby the irradiation range of the headlamp shifts up and down. Upward shift of the irradiation range would cause the glare, meanwhile downward shift would narrow the irradiation range ahead of the vehicle.

The headlamp has therefore a built-in leveling actuator, aimed at correcting shift of the optical axis of the headlamp caused by changes in the front-rear inclination of the vehicle body. A technology called auto-leveling has been known, which automatically controls the leveling actuator in compliance with inclination of the vehicle body. The auto-leveling acts to acquire front-rear inclination of the vehicle body with use of a vehicle-borne sensor, and to correct the optical axis of a lamp unit in the headlamp with use of the actuator, so as to cancel the inclination.

Prior auto-leveling has been designed while focused on meeting regulations that prohibits causing glare to a nearby traffic participant, so that the field of view of a driver would be felt dark in some travel situation.

Another known problem is that a light distribution of a headlamp would vertically fluctuate when a pitch angle of a vehicle body fluctuates with a short period during travel, thus causing a certain object ahead of the vehicle alternately looked bright upon being illuminated with light, or looked dark without being illuminated with light, whereby the field of view becomes less recognizable.

SUMMARY

The present disclosure has been made considering the situation, wherein exemplary one of the objects thereof is to provide a lamp system that can provide an improved field of view to a driver, while preventing glare.

One aspect of the present disclosure relates to a lamp system. A lamp system includes: a lamp structured to emit lamp beam with a light distribution containing a cut-off line; a sensor provided to enable detection of a dynamic component in a pitch angle of a vehicle body during travel; and a controller structured to shift a level of the cut-off line of the light distribution up and down, corresponding to the dynamic component in the pitch angle of the vehicle body, with reference to a predetermined level.

Another aspect of the present disclosure also relates to a lamp system. The lamp system includes: a lamp structured to emit lamp beam with a light distribution containing a cut-off line; a sensor structured to enable detection of a pitch angle of a vehicle during travel; and a controller structured to detect a dynamic deviation of the pitch angle from a reference value in response to an output of the sensor, and to control the lamp so as to keep an angle between a beam that corresponds to the cut-off line of the lamp beam and the road face constant, corresponding to the deviation.

Yet another aspect of the present disclosure relates to a controller that constitutes a lamp system together with a lamp. The lamp is structured to emit lamp beam with a light distribution containing a cut-off line. The controller includes a correction unit structured to detect a dynamic component in a pitch angle of a vehicle body in response to an output of a sensor, and to shift the level of the cut-off line of the light distribution up and down with reference to a predetermined level, so as to cancel the dynamic component in the pitch angle.

Yet another aspect of the present disclosure relates to a method for controlling a lamp. The lamp is structured to emit lamp beam with a light distribution containing a cut-off line. The control method includes detecting a dynamic component of a pitch angle of a driving vehicle body; and shifting the level of the cut-off line of light distribution upwards or downwards with reference to a predetermined level, corresponding to the dynamic component of the pitch angle of the vehicle body.

Note that also free combinations of these constituents, and also any of the constituents and expressions exchanged among the method, apparatus and system, are valid as the modes of the present disclosure. Also note that the description of this section (SUMMARY OF THE INVENTION) does not describe all essential features of the invention, and thus also subcombinations of these features described may constitute the invention.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIGS. 11A to 11D are drawings illustrating exemplary relations (control characteristic) between the dynamic pitch angle $\theta d$ and the correction amount $\Delta V$.

DETAILED DESCRIPTION

Outline of Embodiments

Figure 1:
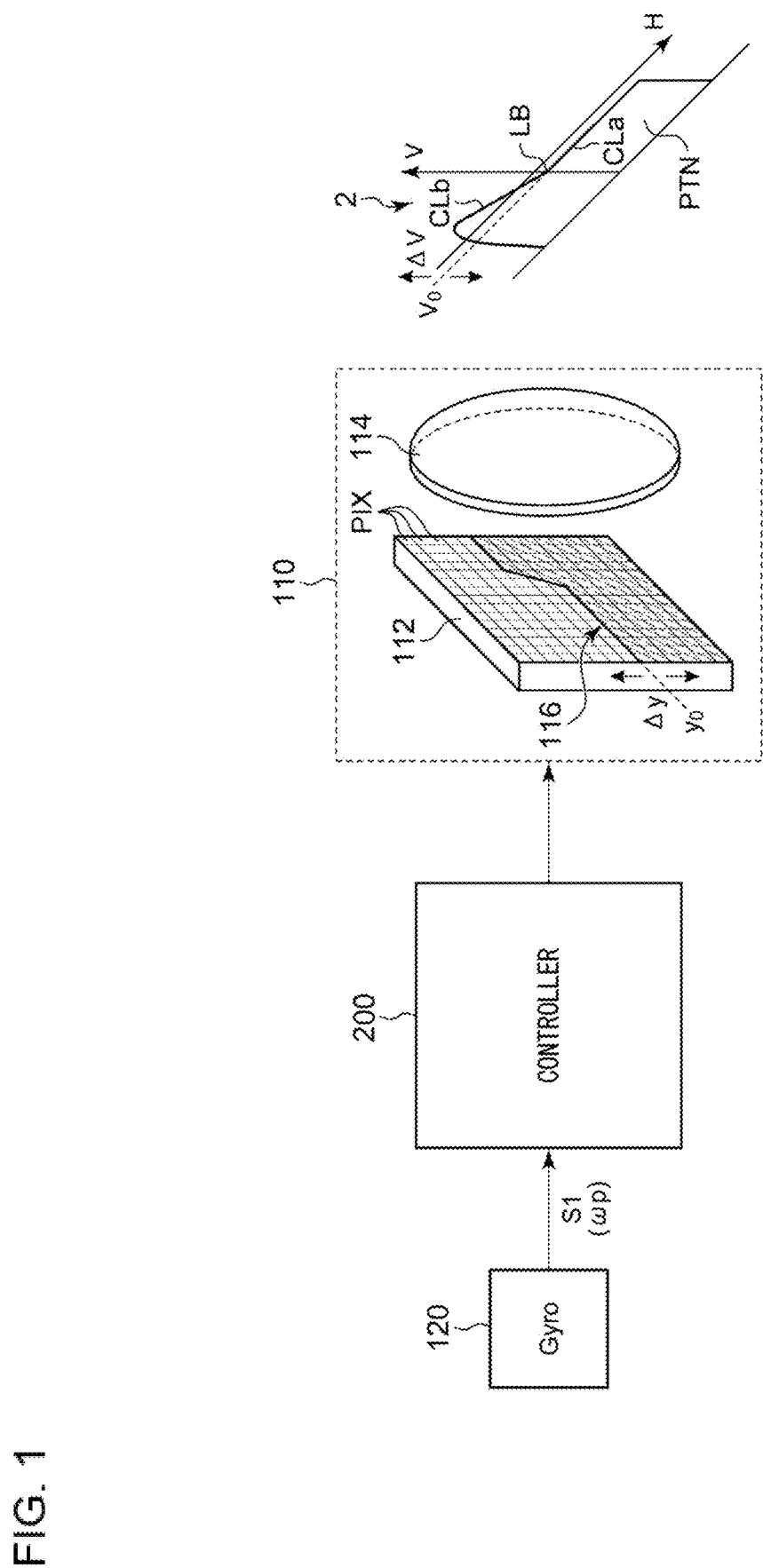
FIG. 1 is a block diagram illustrating a lamp system of embodiment 1.

Some exemplary embodiments of the present disclosure will be outlined. This outline will provide introduction into the detailed description that follows, and will brief some concepts of one or more embodiments for basic understanding thereof, without limiting the scope of the invention or disclosure. Also note this summary is not a comprehensive overview of all possible embodiments, and thus does not limit the essential components of the embodiments. For convenience, the term "one embodiment" may be used to designate one embodiment (Example or Modified Example), or a plurality of embodiments (Examples or Modified Examples) disclosed in the present specification.

A lamp system according to one embodiment includes: a lamp structured to emit lamp beam with a light distribution containing a cut-off line; a sensor provided to enable detection of a dynamic component in a pitch angle of a vehicle body during travel; and a controller structured to shift a level of the cut-off line of the light distribution up and down, corresponding to the dynamic component in the pitch angle of the vehicle body, with reference to a predetermined level.

This structure can prevent glare, if the vehicle body sinks down in the rear part (nose-up), by shifting down the cut-off line, meanwhile can prevent far field of view from dimming, if the vehicle body sinks down in the front part (nose-dive), by shifting up the cut-off line. Note, the control of the level of the cut-off line encompasses (1) a case where only the level of the cut-off line is shifted up and down, while fixing the bottom end of the light distribution of the lamp, and (2) a case where the level of the lower end of the light distribution of the lamp is shifted up and down, following the level of the cut-off line, in other words, a case where the entire light distribution of the lamp is shifted up and down.

In addition, with the control made adaptive to dynamic changes in the pitch angle of the vehicle body, the level of the cut-off line may be kept constant on a virtual perpendicular screen ahead of the vehicle, even if the vehicle body causes front-rear vibration, thereby preventing an object ahead of the vehicle from being looked bright and dark, and thus successfully providing an improved field of view.

In one embodiment, the control characteristic of the controller may be different between upward shift of the cut-off line from a predetermined level, and downward shift of the cut-off line from the predetermined level. Upward shift of the cut-off line from the predetermined level would give glare to a nearby traffic participant, due to influence of delay in the control. Suppression of glare and improvement of the field of view can therefore be appropriately balanced, by making a difference between the control characteristics for the upward direction and the downward direction.

In one embodiment, the predetermined level may be determined with reference to a level on which the cut-off line should fall when the vehicle body stands still. In this case, it suffices to detect pitching with reference to the stationary state to dynamically control the cut-off line, whereby the process is simplified.

In one embodiment, the speed of upward shifting of the cut-off line may be slower than the speed of downward shifting of the cut-off line.

In one embodiment, the amount of upward shift of the cut-off line may be smaller than the amount of downward shift of the cut-off line, per the same change in the pitch angle.

In one embodiment, the shift of the cut-off line may be invalidated, corresponding to the travel situation. The control of the cut-off line may be invalidated, if pitching occurs too rapidly to be followed, or if shifting of the cut-off line unfortunately degrades the field of view.

In one embodiment, the upward shift of the cut-off line may be invalidated, corresponding to the travel situation. When the pitching occurs too rapidly to be followed, the upward shift of the cut-off line may be invalidated to prevent the glare.

In one embodiment, if the cut-off line resides above a predetermined level, the illuminance in a range above the predetermined level may be reduced. This successfully reduces glare to other traffic participant, even if a control delay should occur.

In one embodiment, if the cut-off line resides above a predetermined level, the illuminance in a range above the predetermined level may be gradated so as to be gradually dimmed upwards. This successfully reduces glare to other traffic participant, even if a control delay should occur.

The lamp system according to one embodiment includes: a lamp structured to emit lamp beam with a light distribution containing a cut-off line; a sensor structured to enable detection of a pitch angle of a vehicle during travel; and a controller structured to detect a dynamic deviation of the pitch angle from a reference value in response to an output of the sensor, and to control the lamp so as to keep an angle between a beam that corresponds to the cut-off line of the lamp beam and the road face constant, corresponding to the deviation.

This structure can prevent glare, if the vehicle body sinks down in the rear part, by shifting down the cut-off line, meanwhile can prevent far field of view from dimming, if the vehicle body sinks down in the front part, by shifting up the cut-off line.

In addition, with the control made adaptive to dynamic changes in the pitch angle of the vehicle body, the level of the cut-off line may be kept constant on a virtual perpendicular screen ahead of the vehicle, even if the vehicle body causes front-rear vibration, thereby preventing an object ahead of the vehicle from being looked bright and dark, and thus successfully providing an improved field of view.

In one embodiment, the sensor may contain a gyro sensor. The dynamic pitch angle may be determined by acquiring the angular velocity in the pitch direction with use of the gyro sensor, and then by integrating the angular velocity.

In one embodiment, the lamp may be an adaptive driving beam lamp (also referred to as high-definition lamp) that contains a plurality of individually controllable pixels, and is structured to control the light distribution corresponding to states of the pixels. The controller may shift the boundary between the on-pixel and the off-pixel from among the pixels up and down. This leveling control is referred to as electronic leveling. As compared with mechanical leveling control that uses an actuator to mechanically incline the lamp, the electronic leveling can demonstrate faster response, and can therefore be compliant to pitching at higher frequency.

A controller according to one embodiment constitutes a lamp system, together with an adaptive driving beam lamp. The adaptive driving beam lamp contains a plurality of pixels individually controllable corresponding to image data, and can emit lamp beam with a light distribution corresponded to the image data. The controller has a correction unit that detects a dynamic component of a pitch angle of the vehicle body in response to an output of the sensor, and shifts the level of the cut-off line of light distribution contained in the image data upwards or downwards with reference to a predetermined level, so as to cancel the dynamic component of the pitch angle.

This structure can control the light distribution corresponding to the pitch angle, by shifting the level of the cut-off line on the image data. This can prevent glare, if the vehicle body sinks down in the rear part, by shifting down the cut-off line, meanwhile can prevent far field of view from dimming, if the vehicle body sinks down in the front part, by shifting up the cut-off line.

In addition, with the control made adaptive to dynamic changes in the pitch angle of the vehicle body, the level of the cut-off line may be kept constant on a virtual perpendicular screen ahead of the vehicle, even if the vehicle body causes front-rear vibration, thereby preventing an object ahead of the vehicle from being looked bright and dark, and thus successfully providing an improved field of view.

A control method according to one embodiment relates to a method of controlling a lamp that emits lamp beam with a light distribution containing a cut-off line. The control method includes detecting a dynamic component of a pitch angle of a driving vehicle body; and shifting the level of the cut-off line of light distribution upwards or downwards with reference to a predetermined level, corresponding to the dynamic component of the pitch angle of the vehicle body.

EMBODIMENTS

Preferred embodiments will be explained below, referring to the attached drawings. All similar or equivalent constituents, members and processes illustrated in the individual drawings will be given same reference numerals, so as to properly avoid redundant explanations. The embodiments are merely illustrative, and are not restrictive about the disclosure. All features and combinations thereof described in the embodiments are not always essential to the disclosure.

In the present specification, a "state in which a member A is coupled to a member B" includes a case where the member A and the member B are physically and directly coupled, and a case where the member A and the member B are indirectly coupled while placing in between some other member that does not substantially affect the electrically coupled state, or does not degrade the function or effect demonstrated by the coupling thereof.

Similarly, a "state in which member C is provided between member A and member B" includes a case where the member A and the member C, or the member B and the member C are directly connected, and a case where they are indirectly connected, while placing in between some other member that does not substantially affect the electrical connection state among the members, or does not degrade the function or effect demonstrated by the members.

Embodiment 1

FIG. 1 is a block diagram illustrating a lamp system 100 of Embodiment 1. The lamp system 100 is a headlamp that is mounted on an automobile, and illuminates a field of view ahead of the vehicle with light. The automobile can vary the angle of inclination in the front-rear direction, corresponding to the front-rear weight balance. The front-rear inclination angle corresponds to rotation around a horizontal axis that extends in the left-right direction of the vehicle body, and is referred to as a pitch angle $\theta p$.

The lamp system 100 has a function (auto leveling function) that automatically adjusts the optical axis of the headlamp in the pitch direction, corresponding to the pitch angle $\theta p$.

The lamp system 100 has a high-definition lamp unit 110, a sensor 120, and a controller 200.

In this embodiment, the high-definition lamp unit 110 is an adaptive driving beam lamp which is structured to illuminate a part of, or the entire part of a low beam region. The high-definition lamp unit 110 may alternatively cover a part/all of the high beam region, in addition to a part/all of the low beam region. The high-definition lamp unit 110 contains a plurality of individually controllable pixels PIX, and can emit lamp beam with a light distribution corresponded to states of the pixels PIX. The high-definition lamp unit 110 typically includes a light emitting element array 112, and an illumination optical system 114. The light emitting element array 112 usable here may be an LED array.

The luminance of each pixel PIX may be controllable in two gradations of ON and OFF, or may be controllable in multiple gradations. The pixels, when structured to be controllable in two gradations of ON and OFF, may alternatively be expressed in multiple gradations with the aid of PWM dimming, by which the individual pixels PIX are switched at high speed, while varying the temporal ratio (duty cycle) between the on-time and the off-time.

The illumination optical system 114 projects the output light from the light emitting element array 112, to the front of the vehicle. The illumination optical system 114 may be a lens optical system, a reflection optical system, or a combination thereof.

FIG. 1 illustrates a virtual perpendicular screen 2. The virtual perpendicular screen 2 is assumed to be a coordinate system with reference to the road face. The virtual perpendicular screen 2 may be 10 m, or 25 m away from the vehicle (lamp). On the virtual perpendicular screen 2, a light distribution pattern PTN is created with the lamp beam of the high-definition lamp unit 110. The light distribution pattern PTN is an intensity distribution of the lamp beam seen on the virtual perpendicular screen 2, which corresponds to an on/off pattern of the plurality of pixels PIX of the light emitting element array 112. Note that the correspondence between the position of a certain pixel, with an illumination area on the virtual perpendicular screen 2 ascribed to the pixel, is determined by the illumination optical system 114, and may be occasionally given in a mirror image relation (left-right inversion), up-down inversion, or up-down and left-right inversion.

The light distribution pattern PTN contains a cut-off line CL. In this example, the light distribution pattern PTN contains a horizontal cut-off line CLa and an oblique cut-off line CLb, which intersect at an elbow point LB.

In this embodiment, the controller 200 corrects the optical axis of the low beam in the pitch angle direction, corresponding to fluctuation of the pitch angle $\theta p$ caused by various factors during stop and travel of the vehicle.

Figure 2:
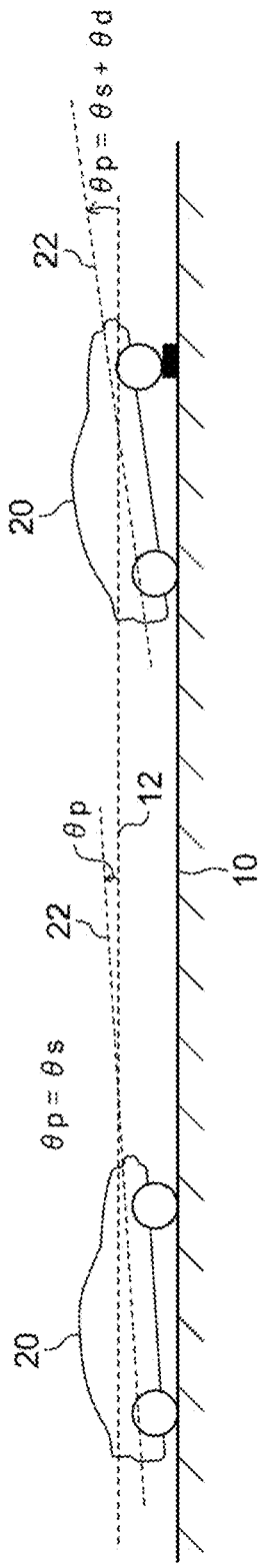
FIGS. 2A and 2B are drawings illustrating pitch angles $\theta p$ of a vehicle body.

FIGS. 2A and 2B are drawings illustrating the pitch angle $\theta p$ of the vehicle body. FIG. 2A illustrates the pitch angle $\theta p$ in a state where the vehicle is in a stop mode. The pitch angle $\theta p$ in a stationary state of the vehicle is defined as static pitch angle $\theta s$. The static pitch angle $\theta s$, representing the posture of the vehicle when stopped, is also referred to as a standing vehicle posture angle. The static pitch angle $\theta s$ is determined corresponding, for example, to the number of passengers, riding position, weight of baggage in a baggage compartment, and rigidity of front and rear suspensions. In this embodiment, an angle formed between a straight line 12 parallel to the road face 10 and a reference line 22 of the vehicle body 20 is defined as a pitch angle $\theta p$, and the direction in which the reference line 22 points upward (nose-up direction) is defined to be positive.

FIG. 2B illustrates the pitch angle $\theta p$ of the vehicle in the drive mode. The pitch angle $\theta p$ of the vehicle in the drive mode may be understood to be the sum of the static pitch angle $\theta s$ and a dynamic component (also referred to as dynamic pitch angle or pitch angle variation) θd. The dynamic pitch angle θd may contain the following components.

(i) Nose-up upon acceleration of vehicle body, and nose-down upon deceleration
(ii) Change in load (weight balance) of vehicle body, typically due to slope of road face
(iii) Rapid vibration of vehicle body due to irregularity on road face
(i) The pitch angle variation upon acceleration or deceleration of the vehicle body, or (ii) the change in the pitch angle due to load change of the vehicle body, which lasts for several seconds, may typically be understood to be DC fluctuation, with a very low frequency component (0.5 Hz or lower).

In contrast, (iii) the vibration of the vehicle body caused by the irregularity on the road face usually falls within the range from approximately 0.5 to 5 Hz, although depending on the rigidity of the suspension or the vehicle weight. The sudden vehicle body vibration typically falls in the range from 0.9 to 2 Hz.

The prior leveling control has removed vibration exceeding approximately 0.5 Hz through a filter, while assuming it as a noise. The prior method has, therefore, not assumed the fast pitch angle variation such as exceeding the cut-off frequency of the filter, out of (i) to (iii), as the matter to be corrected, so that sudden change in the vehicle pitch angle typically due to steep irregularity on the road face during the travel has resulted in sinking down or lifting up of the cut-off line of the low beam.

In contrast, this embodiment actively corrects, rather than removing as a noise, the frequency component exceeding 0.5 Hz (approximately 0.5 to 5 Hz, e.g. 1 to 2 Hz) in the pitch angle variation, which has previously been removed as a noise. In the present specification, the optical axis correction for correcting pitch angle variation during travel is referred to as dynamic leveling.

Referring now back to FIG. 1. The paragraphs below will detail the dynamic leveling, especially a leveling to cope with high-speed pitch angle variation due to irregularity on the road face. The sensor 120 is provided to enable detection of the dynamic component θd in the pitch angle θp, during travel of the vehicle body.

The sensor 120 in this embodiment contains a gyro sensor. The gyro sensor, whose orientation of attachment is freely selectable, is preferably attached so as to align one of the detection axes with the left-right horizontal direction of the vehicle body, thereby generating a detection signal S1 that represents angular velocity op of the rotational movement around the detection axis. The gyro sensor may be triaxial, or monoaxial.

The controller 200 is an electronic control unit (ECU) in which functions related to optical axis correction are integrated, and is assigned to processing regarding the dynamic leveling. The controller 200 may be an ECU dedicated to leveling (also referred to as a leveling ECU), may be an ECU integrated with a controller having other functions, or may be separately embodied in a plurality of ECUs.

The function of the controller 200 may be embodied by software processing, hardware processing, or a combination of software processing and hardware processing. The software processing may be specifically implemented by combining a processor (hardware) such as central processing unit (CPU), micro processing unit (MPU), or microcomputer, with software program executed by the processor (hardware). The controller 200 may be embodied by combination of a plurality of processors (microcontrollers).

The hardware processing is specifically implemented by hardware such as application specific integrated circuit (ASIC), controller IC, or field programmable gate array (FPGA).

The controller 200 detects the dynamic component θd in the pitch angle θp during travel of the vehicle, by integrating the angular velocity op represented by the detection signal S1. Now, the dynamic component θd may be understood as a component, out of the fluctuation of the pitch angle θp, contained in a frequency band higher than 0.5 Hz. For example, a component contained in a predetermined frequency band, out of the fluctuation of the pitch angle θp, is determined as the dynamic component to be corrected. The predetermined frequency band may be determined typically within the range from approximately 0.5 Hz to 5 Hz. Which frequency band is to be corrected may only be determined, typically depending on rigidity of the suspension, or the mass of the vehicle body.

The controller 200 shifts the level of the cut-off line CL in the light distribution pattern PTN (level in the vertical direction V, or, the optical axis), with reference to the predetermined level $v_0$, corresponding to the dynamic component θd in the pitch angle θp of the vehicle body during travel. The prior leveling control has shifted the optical axis only downwards, for the purpose of suppressing glare. In contrast, the dynamic leveling according to this embodiment will actively shift the level of the cut-off line CL, not only downwards, but also actively upwards.

Note, the control of the level of the cut-off line CL encompasses (1) a case where only the level of the cut-off line is shifted up and down, while fixing the bottom end of the light distribution of the lamp, and (2) a case where the level of the lower end of the light distribution of the lamp is shifted up and down, following the level of the cut-off line, in other words, a case where the entire light distribution of the lamp is shifted up and down.

The controller 200 shifts the cut-off line CL downwards, corresponding to a positive dynamic pitch angle θd. In addition, the controller 200 in this embodiment shifts the cut-off line CL actively also upwards, corresponding to a negative dynamic pitch angle θd.

In more detail, the controller 200 shifts the level of the cut-off line CL up and down with reference to the predetermined level $V_0$, so as to cancel the dynamic component θd in the pitch angle θp. The predetermined level $V_0$ represents a coordinate in the vertical direction on which the cut-off line CL should fall, when the variation of the pitch angle θp equals zero.

For example, the controller 200 shifts an ON-OFF boundary 116 in the plurality of pixels PIX of the light emitting element array 112, in order to shift the cut-off line CL up or down on the virtual perpendicular screen 2. By how many pixels the boundary 116 should be shifted, with respect to a certain variation range of the pitch angle θp, may be determined in terms of geometrical optics. Let the shift amount of pixel be Δy.

Figure 3:
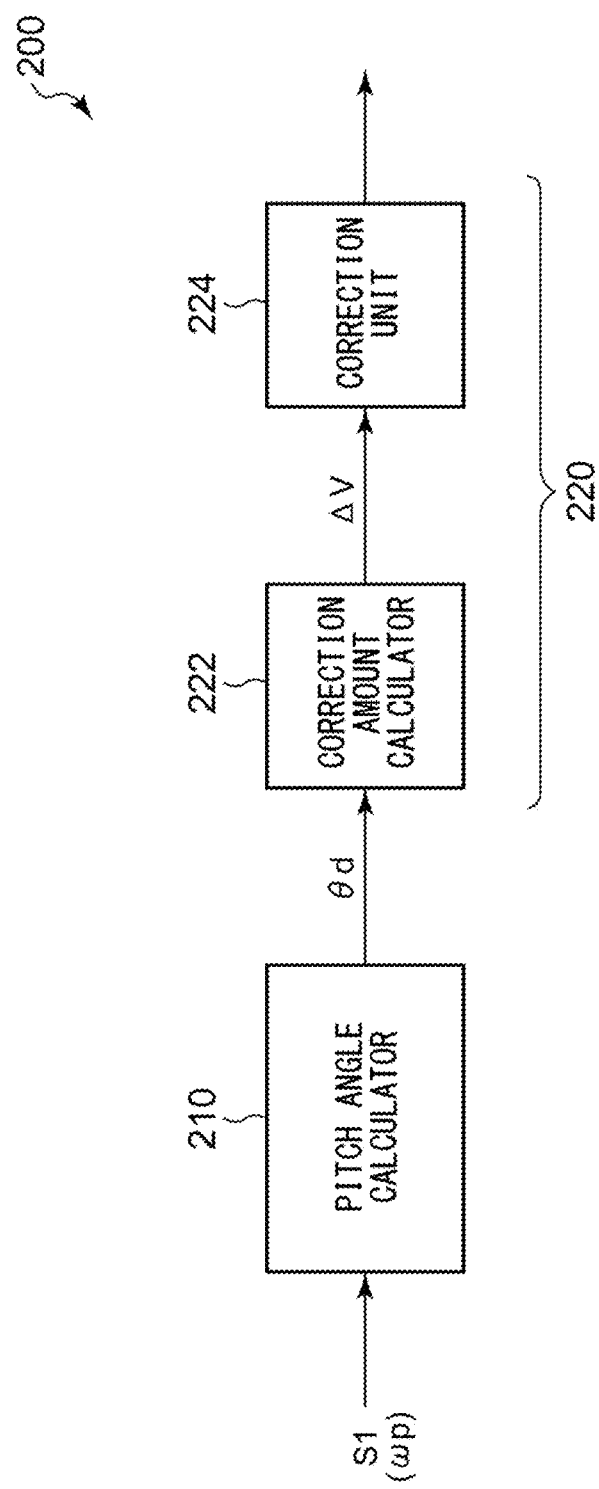
FIG. 3 is a functional block diagram of a controller.

FIG. 3 is a functional block diagram of a controller 200. The controller 200 has a pitch angle calculator 210 and a cut-off line control unit 220.

The pitch angle calculator 210 detects the dynamic component θd in the pitch angle θp, in response to an output of the sensor 120. For example, the pitch angle calculator 210 integrates the angular velocity op indicated by the detection signal S1. The pitch angle calculator 210 also optionally subject the integral value to arithmetic processing, to derive the dynamic pitch angle θd. This arithmetic processing may typically include filtering (band limiting), and moving average processing.

The cut-off line control unit 220 shifts up or down the level of the cut-off line CL, in response to the dynamic pitch angle θd. The cut-off line control unit 220 has a correction amount calculator 222 and a correction unit 224. The correction amount calculator 222 calculates the amount of vertical shift (correction amount ΔV) of the cut-off line CL on the virtual perpendicular screen 2, in response to the dynamic pitch angle θd. In this embodiment, the positive correction amount ΔV corresponds to the upward shift of the cut-off line CL, meanwhile the negative correction amount ΔV corresponds to the downward shift of the cut-off line CL. The correction unit 224 controls the light emitting element array 112, so as to shift the cut-off line CL by the correction amount ΔV.

For example, the light emitting element array 112 has an interface through which image data that specifies ON-OFF (or luminance) of the pixels PIX is input. The correction unit 224 in this case may shift up or down the level of the boundary 116 between the on-pixels and the off-pixels contained in the image data, by the number of pixels Δy, corresponding to the correction amount ΔV. That is, the correction unit 224 shifts up or down the level of the cut-off line CL (boundary 116) in the light distribution pattern contained in the image data, with reference to the predetermined level $y_0$, so as to cancel the dynamic component θd in the pitch angle θp. The predetermined level $y_0$ represents a reference level that corresponds to $V_0$.

The correction unit 224 may alternatively shift up or down the level (height) of the boundary between the ON-pixels and the OFF-pixels that corresponds to the lower end of the light distribution pattern, by the number of pixels Δy that corresponds to the correction amount ΔV, in addition to the level (height) of the boundary 116 between the ON-pixels and the OFF-pixels that corresponds to the cut-off line CL. That is, the correction unit 224 may shift the entire light distribution pattern up and down, by the number of pixels Δy that corresponds to the correction amount ΔV.

The structure of the lamp system 100 has been described. Next, operations thereof will be explained.

Figure 4:
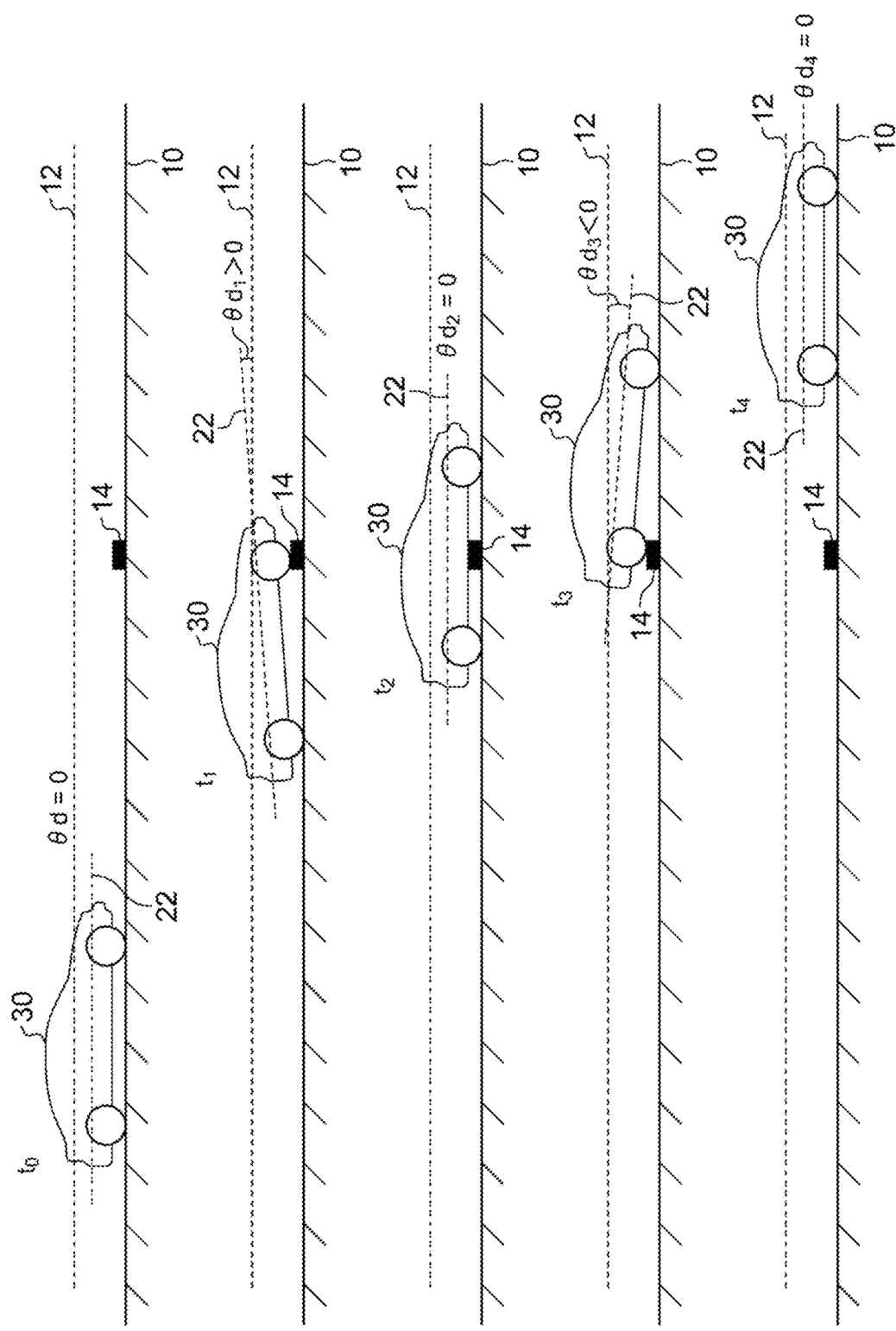
FIG. 4 is a drawing illustrating an exemplary travel scene of a vehicle.

FIG. 4 is a drawing illustrating an exemplary travel scene of a vehicle. In this example, a vehicle 30 travels from left to right in the drawing, while getting over a step 14 on the road face 10. FIG. 4 illustrates posture of the vehicle 30 at a plurality of times $t_0$ to $t_4$. The individual times $t_0$ to $t_4$ stand for the following states.

Time $t_0$: State of travel in front of step 14
Time $t_1$: State of front wheel run on step 14
Time $t_2$: State of front wheel climbed over step 14
Time $t_3$: State of rear wheel run on step 14
Time $t_4$: State of rear wheel climbed over step 14

The dynamic pitch angle θd at each of the times $t_0$, $t_2$, and $t_4$ equals 0. The dynamic pitch angle θd at time $t_1$ has a positive value $θd_1$, and the dynamic pitch angle θd at time $t_2$ has a negative value $θd_3$.

Figure 5:
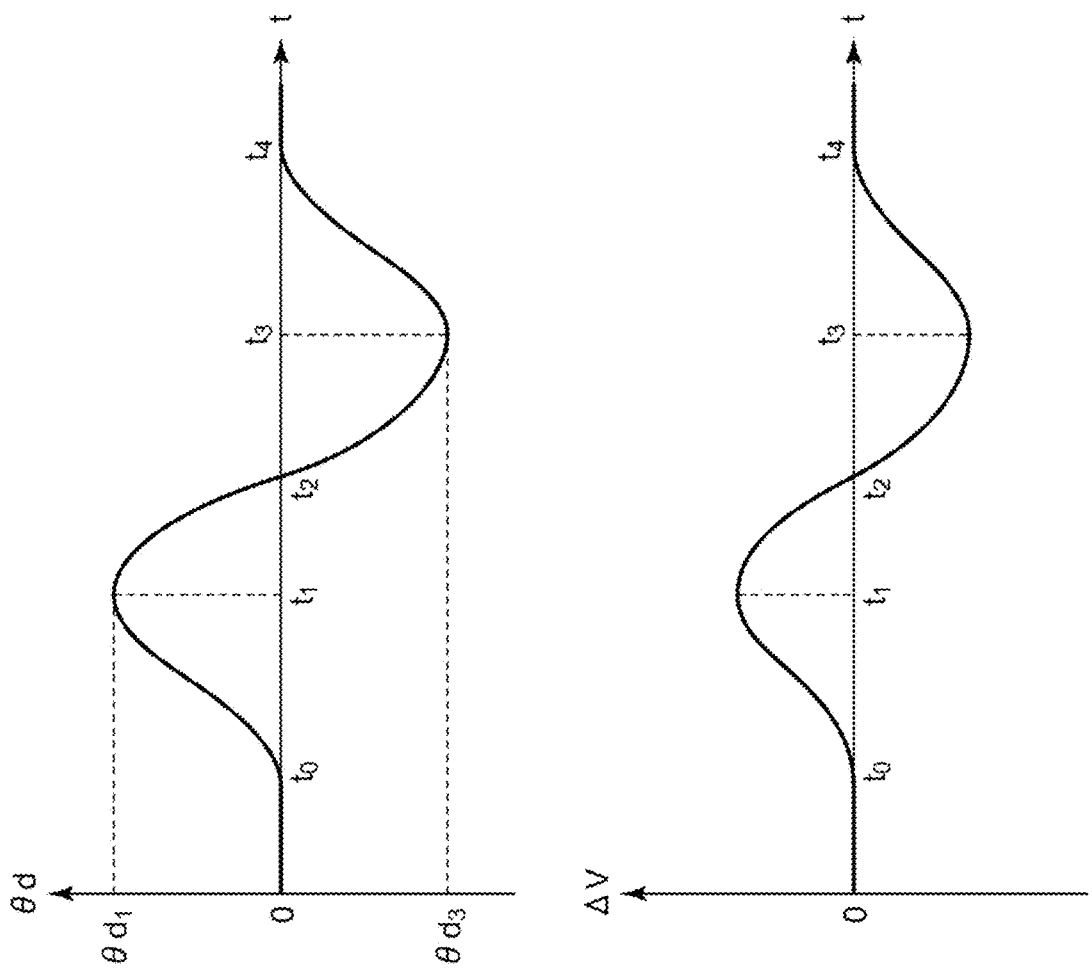
FIG. 5 is a drawing illustrating a waveform of dynamic pitch angle $\theta d$ and a waveform of correction amount $\Delta V$, corresponded to the travel scene illustrated in FIG. 4.

FIG. 5 is a drawing illustrating a waveform of dynamic pitch angle θd and a waveform of correction amount ΔV, corresponded to the travel scene illustrated in FIG. 4. As illustrated in FIG. 4, the dynamic pitch angle θd swings in the positive direction, then swings in the negative direction, and finally returns to 0.

The correction amount ΔV is generated corresponding to such variation of the dynamic pitch angle θd.

Figure 6:
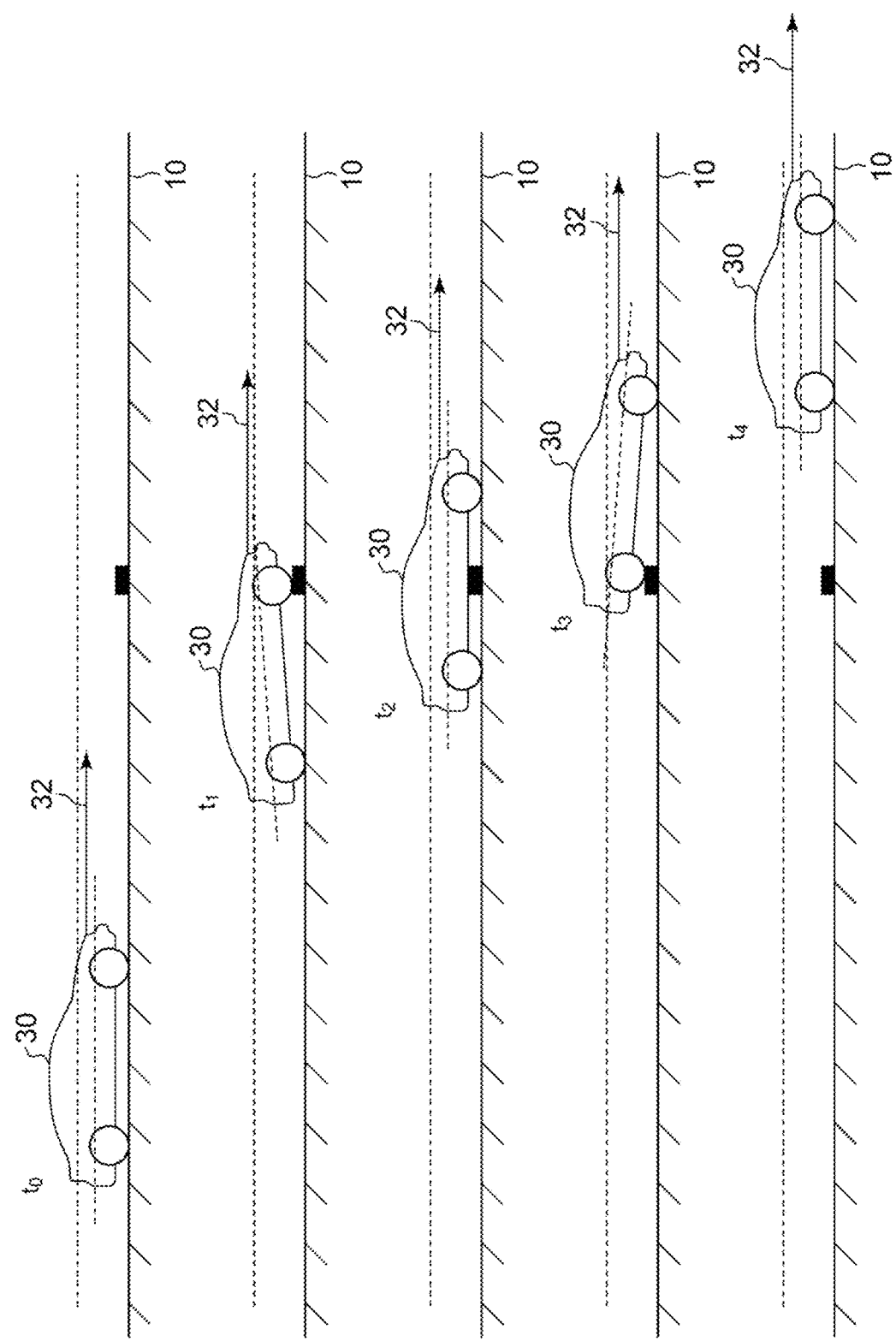
FIG. 6 is a drawing illustrating lamp beams corresponded to a cut-off line of the light of the headlamp, in the travel scene illustrated in FIG. 4.

FIG. 6 is a drawing illustrating light beams corresponded to the cut-off line of the lamp beam of the headlamp, in the travel scene illustrated in FIG. 4. A beam 32 of the lamp beam may be kept at a constant angle away from the road face 10, with use of the adaptive light driving beam control in compliance with the dynamic pitch angle θd.

The operation of the lamp system 100 has been described. The lamp system 100 can prevent glare by shifting the cut-off line downwards, when the vehicle 30 sinks in the rear part at time $t_1$ as illustrated in FIG. 6. Meanwhile, the lamp system 100 can prevent a far field of view from being looked dark, by shifting the cut-off line upwards, when the vehicle 30 sinks down in the front part at time $t_3$ as illustrated in FIG. 6.

In addition, with the control made adaptive to dynamic changes in the pitch angle θ of the vehicle body, the level of the cut-off line may be kept constant on a virtual perpendicular screen ahead of the vehicle, even if the vehicle 30 causes front-rear vibration (pitching), thereby preventing an object ahead of the vehicle from being looked bright and dark, and thus successfully providing an improved field of view.

The static pitch angle θs may be understood to be a reference value of the pitch angle θp, and the dynamic pitch angle θd may be understood as a dynamic deviation of the pitch angle θp from the reference value. The controller 200 may therefore be understood to control the high-definition lamp unit 110, so as to keep a constant angle between the beam 32 that corresponds to the cut-off line of the lamp beam, and the road face 10, corresponding to the deviation θd.

Paragraphs below will explain an exemplary control of light distribution adaptive to changes in the pitch angle θp, by the controller 200.

Figure 7A:
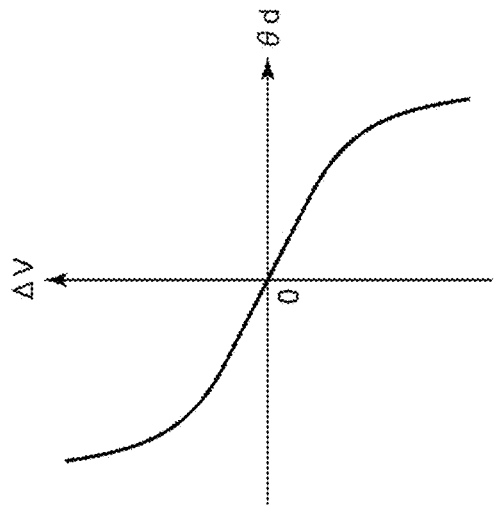
FIGS. 7A to 7C are drawings illustrating exemplary relations (control characteristic) between the dynamic pitch angle $\theta d$ and the correction amount $\Delta V$.
Figure 7B:
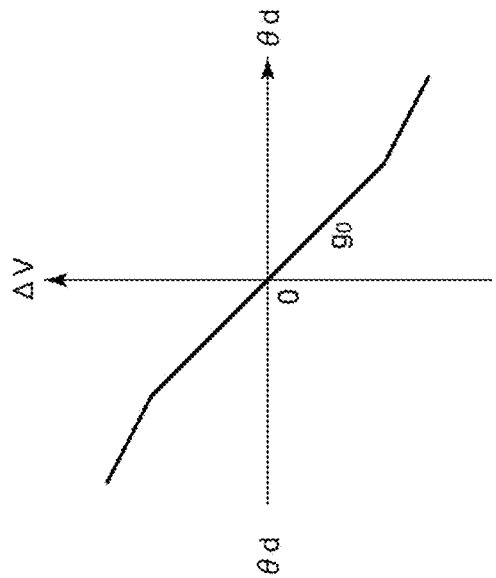
Figure 7C:
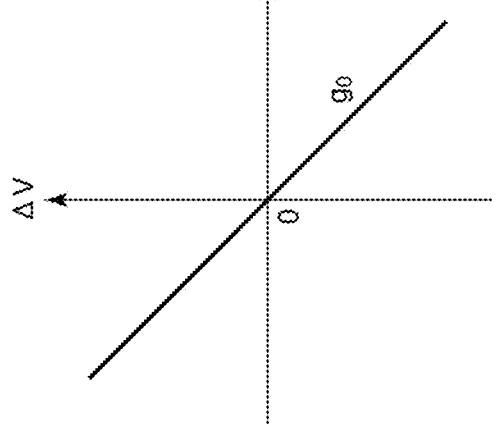

FIGS. 7A to 7C are drawings illustrating exemplary relations (control characteristic) between the dynamic pitch angle θd and the correction amount ΔV.

Letting now the amount of correction ΔV be the amount of shift of the cut-off line CL on the virtual perpendicular screen, and letting the distance up to the virtual perpendicular screen be L, it suffices that Equation (1) holds.

$$\Delta V = L \times \tan\theta d \quad (1)$$

If θd≈0, then tan θd≈θd, so we obtain Equation (2).

$$\Delta V \approx L \times \theta d \quad (2)$$

Hence, the correction amount ΔV may be most simply given, as illustrated in FIG. 7A, by a linear function having a proportional constant derived from the distance L (referred to as reference gain $g_0$), multiplying the dynamic pitch angle θd. In a case where the image data to be supplied to the light emitting element array 112 is corrected as described above, the boundary 116 that corresponds to the cut-off line on the image data is shifted up or down, so that the correction amount ΔV is obtainable. The shift amount Δy of the pixel in this case may be determined in consideration of the design of the illumination optical system 114 with use of a function f( ) derivable in terms of geometrical optics, where a relation Δy=f(θd) holds. If the illumination optical system 114 is a simple one, the f( ) may be approximated by a linear function, as expressed by Equation (3).

$$\Delta y = \alpha \cdot \theta d \quad (3)$$

Meanwhile, if the illumination optical system 114 has complexity such as containing a reflecting mirror with a hyperbolic paraboloid, elliptic paraboloid, rotating paraboloid, or free paraboloid, the correction amount $\Delta V$ may be specified by a polyline with respect to the dynamic pitch angle $\theta d$, as illustrated in FIG. 7B.

Alternatively, even with use of a simple optical system, the control characteristic as illustrated in FIG. 7B may be employable, for the purpose of reducing the correction amount $\Delta V$ with respect to the unit variation of the dynamic pitch angle $\theta d$, in a region where the variation amount (absolute value of $\theta d$) is large. This case can suppress glare, when control delay occurs in a situation that the nose-dive is immediately followed by the nose-up.

Meanwhile, for the illumination optical system 114 having a complexity such as containing the reflecting mirror with an elliptic paraboloid or a free paraboloid, a more intricate control characteristic may be specified as illustrated in FIG. 7C.

The upward shift of the cut-off line may be invalidated, corresponding to the travel situation. In an exemplary case where the dynamic pitch angle $\theta d$ includes a frequency component exceeding the response rate of the controller 200, the glare may be suppressed by invalidating the upward shift of the cut-off line.

Alternatively, not only the upward shift, but also the downward shift of the cut-off line may be invalidated. A case where irregularity continues on the road face (for example, 3 seconds or longer in a temporal sense), the road face is assumed to be a special one (dirt course, unpaved mountain road, etc.), rather than usual road for driving. In a case where sharp pitch angle variation continues for a predetermined duration (3 seconds) or longer, the pitch angle control may be fixed to the one having been acquired during the stop or stable travel mode. The cut-off line, when returned back to the previous state, is preferably returned gradually over several seconds, rather than returned promptly. In a case with use of the high-definition lamp unit 110 that can control the intensity distribution in multiple gradations, the cut-off line is preferably returned gradually while producing blurring or gradation.

(Asymmetrical Vertical Control)

The process of actively shifting up the optical axis upwards upon nose-diving brings about an effect of maintaining a far field of view. On the other hand, this would give glare to a nearby traffic participant, in case of control delay, or unexpected change in the road face.

Figure 8:
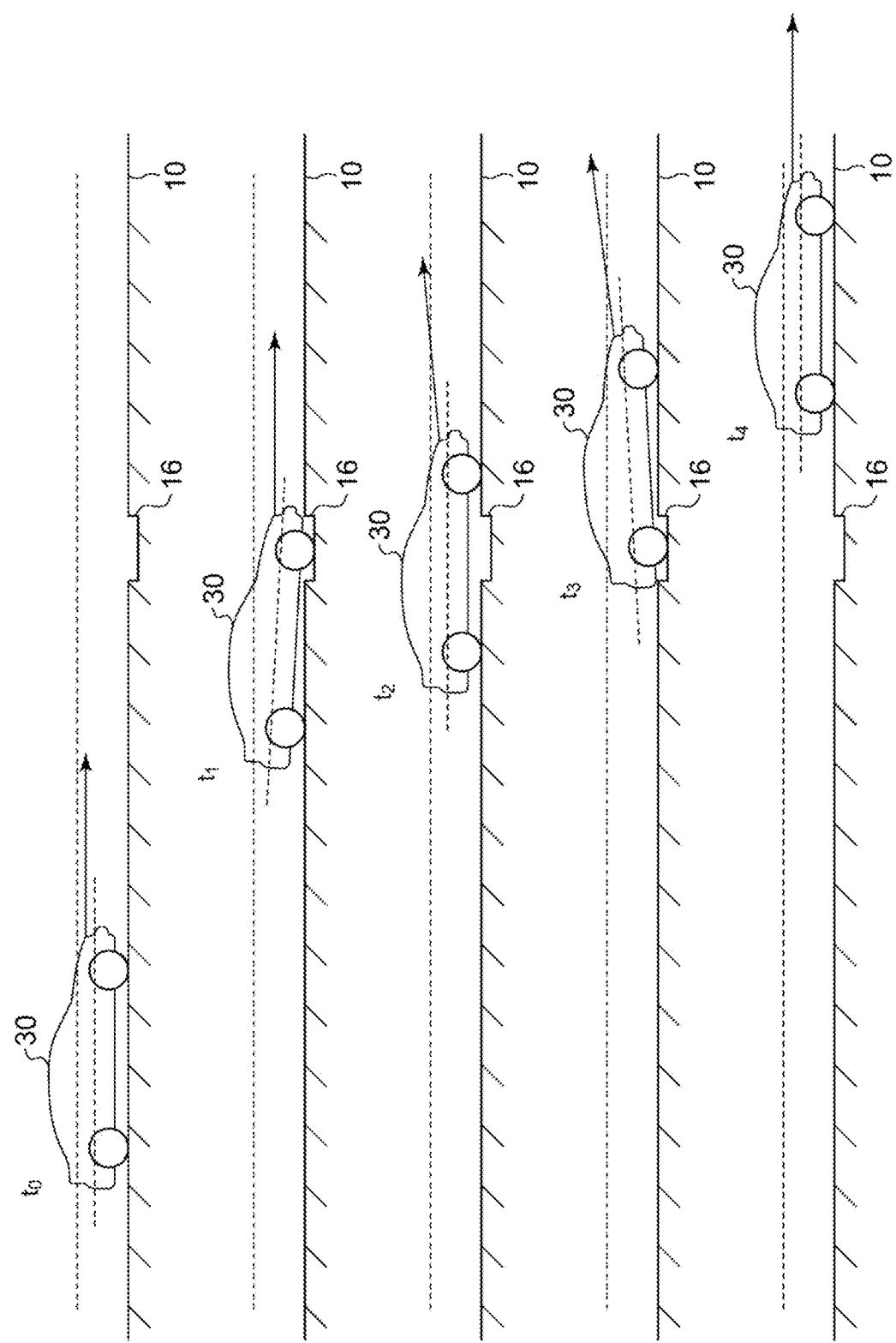
FIG. 8 is a drawing illustrating glare possibly resulted from correction of the optical axis upon nose-dive.

FIG. 8 is a drawing illustrating glare possibly resulted from correction of the optical axis upon nose-dive. In this example, the vehicle 30 travels from left to right in the drawing, while passing over a dent 16 on the road face 10. FIG. 4 illustrates posture of the vehicle 30 at a plurality of times $t_0$ to $t_4$. The individual times $t_0$ to $t_4$ stand for the following states.

Time $t_0$: State of travel in front of dent 16
Time $t_2$: State of front wheel fell in dent 16
Time $t_2$: State of front wheel passed recess 16
Time $t_3$: State of rear wheel fell in dent 16
Time $t_4$: State of rear wheel passed recess 16

When the vehicle causes nose-dive at time $t_1$, the level of the cut-off line is corrected so as to direct the optical axis upwards. At subsequent time $t_2$, the posture of the vehicle returns to the normal one, which is represented by $\theta d=0$. The controller 200 in this case tries to return the cut-off line to the original predetermined level $v_0$. However in case of control delay, the cut-off line cannot fully return back to the predetermined level $v_0$, and will remain above the predetermined level $v_0$. This would cause illumination of the lamp beam above the horizontal line, and would cause glare.

Further in the nose-up state at time $t_3$, the controller 200 tries to correct the level of the cut-off line below the predetermined level $v_0$, so as to direct the optical axis downwards. Also in this case if associated with control delay, the cut-off line cannot fully fall down to the target level that corresponds to the current posture, possibly causing the lamp beam illuminated above the horizontal line, and causing glare.

The problem, having described with reference to FIG. 8, may be solved by an asymmetrical vertical control described below.

In the examples of FIGS. 7A to 7C, the same control characteristic was applied to both cases where the dynamic pitch angles $\theta d$ are positive and negative, in other words, to both cases where the cut-off line CL shifts upwards from the predetermined level, and downwards from the predetermined level. In contrast, the asymmetrical vertical control adopts asymmetry, corresponding to the sign (direction) of the dynamic pitch angle $\theta d$.

That is, the control characteristic of the cut-off line CL may differ between the cases where the dynamic pitch angles $\theta d$ are positive and negative, in other words, between the cases where the cut-off line CL shifts upwards from the predetermined level, and downwards from the predetermined level. The control characteristic herein relates to correlation between the dynamic pitch angle $\theta d$ and the correction amount $\Delta V$, which is exemplified by the aforementioned function f( ), and parameters (gain and order) that define the function f( ).

Figure 9A:
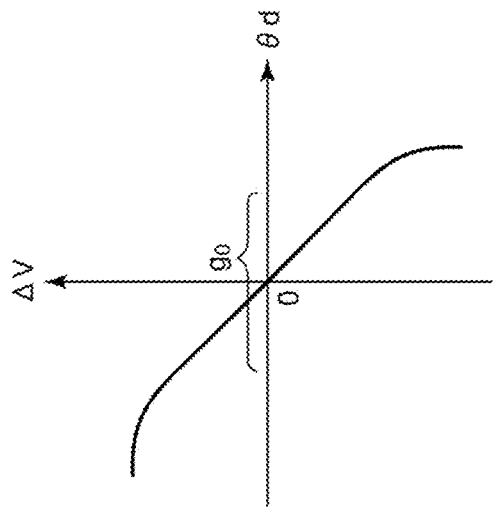
FIGS. 9A to 9C are drawings illustrating exemplary relations (control characteristic) between the dynamic pitch angle $\theta d$ and the correction amount $\Delta V$.
Figure 9B:
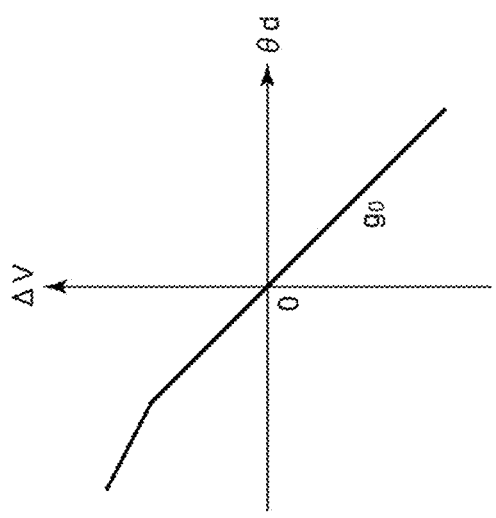
Figure 9C:
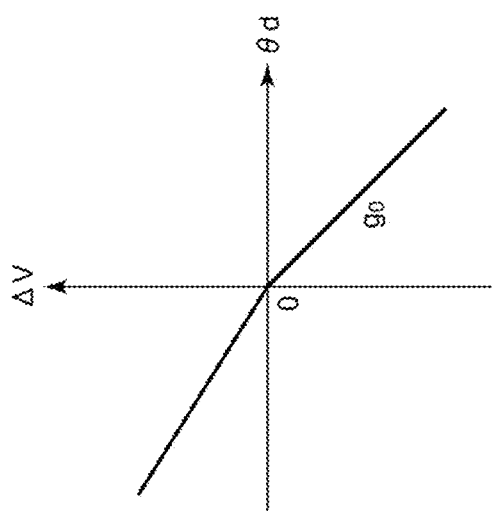

FIGS. 9A to 9C are drawings illustrating exemplary relations (control characteristic) between the dynamic pitch angle $\theta d$ and the correction amount $\Delta V$. The example illustrated in FIG. 9A has the control characteristic that follows a linear function similarly to as in FIG. 7A, but with different gains (inclination) for $\theta d>0$ (nose-up) and $\theta d<0$ (nose-dive). In other words, given the dynamic pitch angle $\theta d$ having the same absolute value with different signs, the correction amount $\Delta V$ may be relatively large if $\theta d>0$, meanwhile the correction amount $\Delta V$ may be relatively small if $\theta d<0$.

More specifically, in the region of $\theta d>0$, the control characteristic has a slope (reference gain $g_0$) derived from distance L, as expressed by Equation (2). This can reliably prevent glare.

On the other hand, in the region of $\theta d<0$, the slope is smaller than the slope in the region of $\theta d>0$ which represents the reference gain $g_0$. That is, in case of nose-dive, the amount of shifting the optical axis upwards is suppressed. This case can suppress glare possibly exerted on a nearby traffic participant, when control delay occurs in a situation that the nose-dive is immediately followed by the nose-up. The problem having been described with reference to FIG. 8 may thus be solved.

Figure 10:
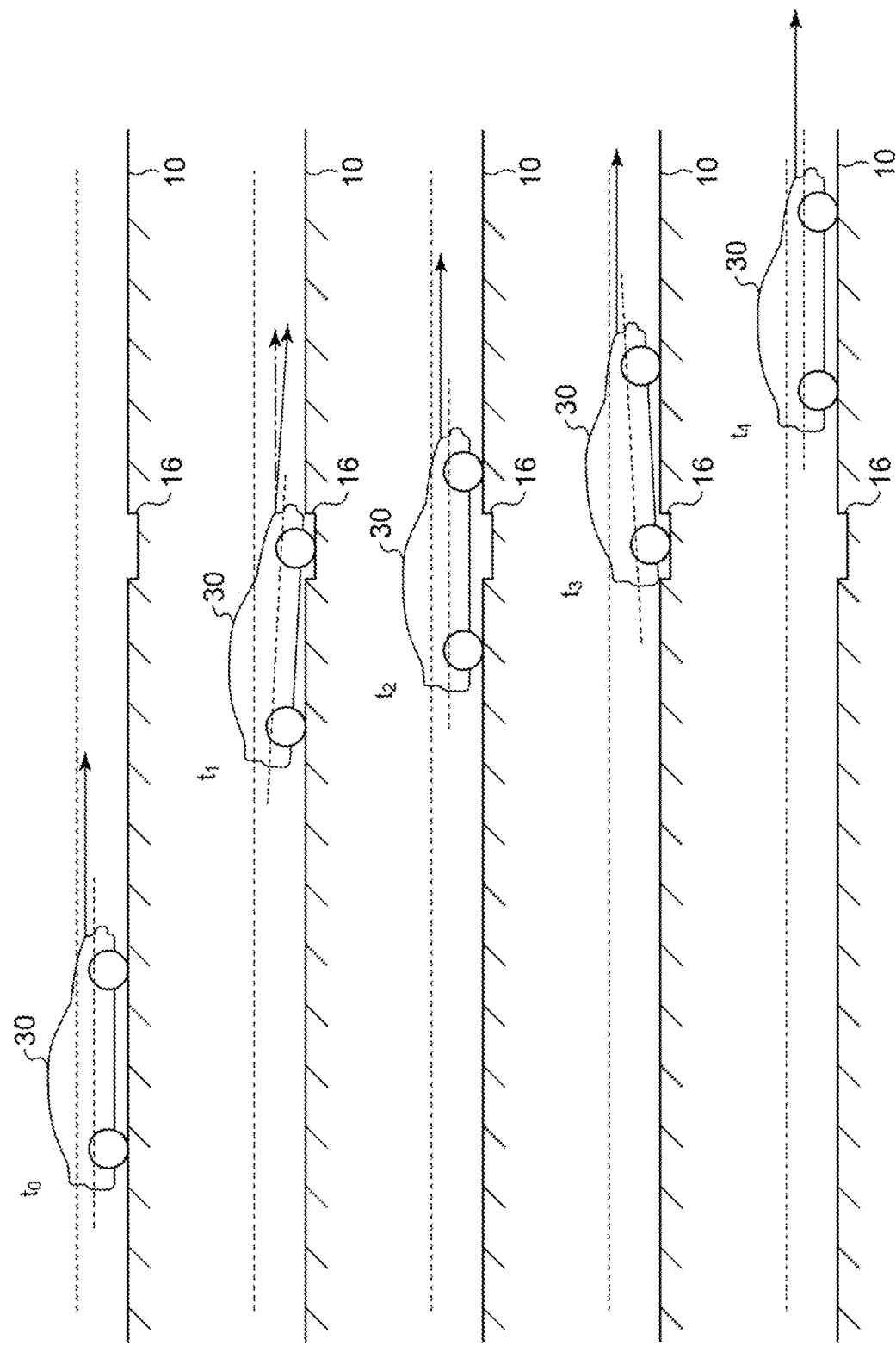
FIG. 10 is a drawing illustrating correction of optical axis, according to control characteristic illustrated in FIG. 9A.

FIG. 10 is a drawing illustrating correction of optical axis, with reference to control characteristic illustrated in FIG. 9A. FIG. 10 illustrates the control characteristic of FIG. 9A adopted to the travel scene same as in FIG. 8. When the vehicle causes nose-dive at time $t_1$, the level of the cut-off line is corrected so as to direct the optical axis upwards. Now $\theta d<0$ holds, then the correction amount $\Delta V$ becomes smaller than the correction amount in the case of FIG. 8. A dash-dot line represents the optical axis in FIG. 8, and a solid line represents the optical axis derived from the control characteristic in FIG. 9A.

At subsequent time $t_2$, the posture of the vehicle returns to the normal one, which is represented by θd=0. The controller 200 in this case tries to return the cut-off line to the original predetermined level $v_0$. Since the correction amount ΔV in the just-preceding nose-dive is suppressed low, so that the cut-off line can return to the predetermined level $v_0$ even in case of control delay. This can keep the lamp beam below the horizontal line, thus suppressing glare.

Referring now back to FIG. 9B. The example of FIG. 9B has a negative threshold value $θ_{TH}$ specified therein, so that the slope represents the reference gain $g_0$ in the region of θd>$θ_{TH}$. On the other hand, in the region of θd<$θ_{TH}$, the slope is smaller than the slope that represents the reference gain $g_0$.

Hence upon shallow nose-dive, the far field of view may be maintained by correcting the optical axis with a basic gain. On the other hand, upon deep nose-dive, the amount of upward shift of the optical axis is suppressed. This case can suppress glare possibly exerted on a nearby traffic participant, when control delay occurs in a situation that the nose-dive is immediately followed by the nose-up. The problem described with reference to FIG. 8 may thus be solved.

In the example of FIG. 9C, the slope represents the reference gain $g_0$ in the region of θd≈0, whereas the slope increases in the region of θd>0, as the variation amount (absolute value) increases. This directs the optical axis downwards more largely than theoretically required, in a situation with large nose-up. This can more reliably suppress glare.

Conversely, the slope decreases in the region of θd<0, as the variation amount (absolute value) increases. This directs the optical axis upwards to a lesser extent than theoretically required, in a situation with deep nose-dive. This can suppress glare possibly exerted on a nearby traffic participant, when control delay occurs in a situation that the posture changes to nose-up immediately thereafter. The problem described with reference to FIG. 8 may thus be solved.

Assuming now a transfer function H(s) that involves the dynamic pitch angle θd as an input and the correction amount ΔV as an output, the transfer function can contain a filter element, so that the control characteristic, or a filter characteristic, may differ between the cases where the cut-off line CL shifts upwards from the predetermined level, and downwards from the predetermined level.

FIGS. 11A to 11D are drawings illustrating exemplary relations (control characteristic) between the dynamic pitch angle θd and the correction amount ΔV. In FIG. 11A, frequency characteristic (cut-off frequency) is the same in both regions of θd>0 and θd<0, with a difference only in the gain g.

In FIG. 11B, the gain equals to the reference gain $g_0$ in both regions of θd>0 and θd<0, with different frequency characteristics. More specifically, the dynamic pitch angle θd is corrected over a wider frequency range in the region of θd>0 (nose-up), thus reliably preventing glare. Meanwhile in the region θd<0 (nose-dive), the frequency band over which the dynamic pitch angle θd is corrected is narrowed. This can reduce the risk of glare due to control delay.

Also in FIG. 11C, the gain equals to the reference gain $g_0$ in both regions of θd>0 and θd<0 similarly to as in FIG. 11B, but with different frequency characteristics. In FIG. 11C, the frequency band over which the dynamic pitch angle θd is corrected is narrowed in the region of θd<0 (nose-dive), but with the band for correction shifted to a higher region than in FIG. 11B.

In FIG. 11D, both of the gain g and the frequency characteristic are different for the regions of θd>0 and θd<0.

In another approach, the speed at which the cut-off line CL is shifted up and down corresponding to the posture of the vehicle body may be changed. More specifically, the speed of upward shifting of the cut-off line may be slower than the speed of downward shifting of the cut-off line. This makes it less likely to cause glare, after upward correction of the cut-off line CL.

Alternatively, the upward shift of the cut-off line may be invalidated, corresponding to the travel situation. In an exemplary case where the dynamic pitch angle θd includes a frequency component exceeding the response rate of the controller 200, the glare may be suppressed by invalidating the upward shift of the cut-off line.

Alternatively, not only the upward shift, but also the downward shift of the cut-off line may be invalidated. A case where irregularity continues on the road face (for example, 3 seconds or longer in a temporal sense), the road face is assumed to be a special one (dirt course, unpaved mountain road, etc.), rather than usual road for driving. In a case where sharp pitch angle variation continues for a predetermined duration (3 seconds) or longer, the pitch angle control may be fixed to the one having been acquired during the stop or stable travel mode. The cut-off line, when returned back to the previous state, is preferably returned gradually over several seconds, rather than returned promptly. In a case with use of the high-definition lamp unit 110 that can control the intensity distribution in multiple gradations, the cut-off line is preferably returned gradually while producing blurring or gradation.

In a case where the high-definition lamp unit 110 can create a multi-gradation light distribution, the controller 200 may change the intensity distribution of the light distribution (illuminance distribution), in addition to the shifting of the cut-off line (leveling control).

Figure 12A:
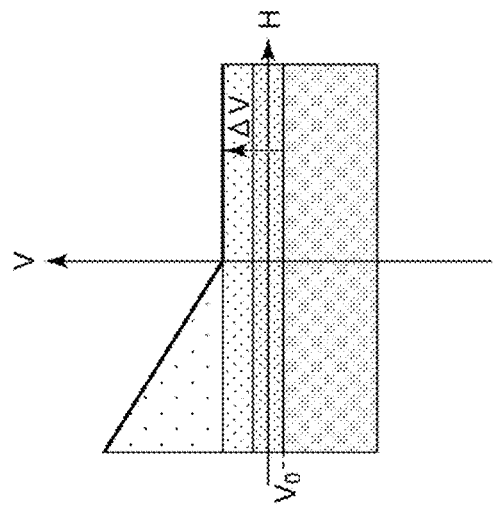
FIGS. 12A to 12C are drawings illustrating exemplary control of an intensity distribution of light distribution.
Figure 12B:
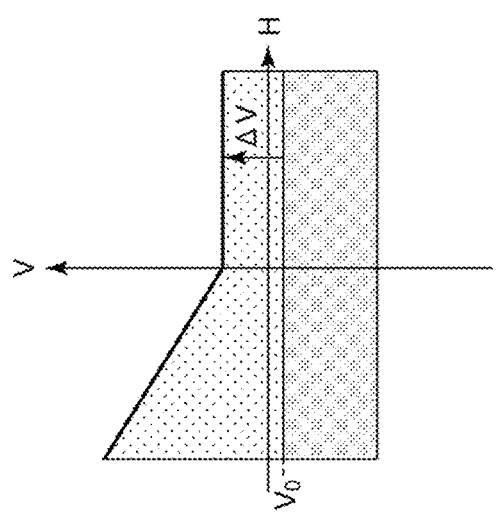
Figure 12C:
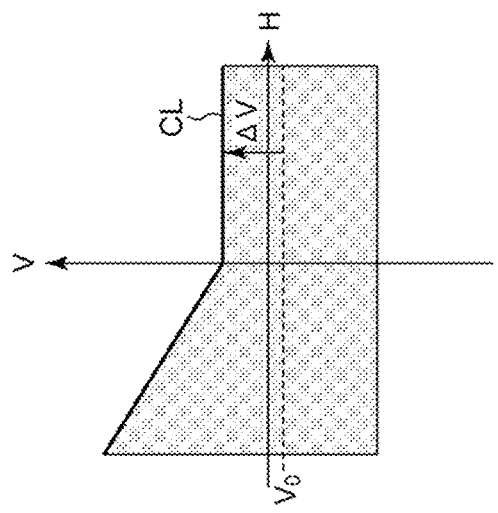

FIGS. 12A to 12C are drawings illustrating exemplary control of an intensity distribution of light distribution. FIG. 12A exemplifies a most standard light distribution control, in which only the cut-off line CL is shifted upwards, with the illuminance kept substantially constant. Note that FIGS. 12A to 12C depict the illuminance by hatching with varied density, wherein the larger the density, the higher the illuminance.

In the example of FIG. 12B, when the cut-off line CL resides above the predetermined level $v_0$, the controller 200 lowers the illuminance in the region above the predetermined level $v_0$, to a level lower than the illuminance (prescribed value) in FIG. 12A. This makes glare less likely to occur, while maintaining the driver's far field of view.

In the example of FIG. 12C, when the cut-off line CL resides above a predetermined level $v_0$, the light distribution has an intensity distribution in which the illuminance in the region above the predetermined level $V_0$ is gradated so as to be gradually dimmed upwards. This makes glare less likely to occur, while maintaining the driver's far field of view.

Modified Example 1

A modified example derived from Embodiment 1 will be described.

Modified Example 1.1

The embodiment has detected the dynamic component of the pitch angle with use of the gyro sensor. The present disclosure is, however, not limited thereto. For example, the dynamic component of the pitch angle may be detected with use of a combination of a front vehicle height sensor arranged on the front suspension of the vehicle body, and a rear vehicle height sensor arranged on the rear suspension of the vehicle body.

Modified Example 1.2

The embodiment has constituted the high-definition lamp unit 110 with the light emitting element array 112. The present disclosure is, however, not limited thereto. For example, the high-definition lamp unit 110 may contain a light source that generates light with a substantially flat intensity distribution, and a spatial light modulator that spatially patterns the emitted light of the light source. The spatial light modulator is exemplified by digital micromirror device (DMD), and liquid crystal device.

Modified Example 1.3

The technique by which the controller 200 shifts the level of the cut-off line CL up and down is not limited to that described in the embodiments. For example, the light emitting element array 112 may have a pixel shifting function. In this case, the light emitting element array 112 may only be given the image data as the reference, and the pixel shift amount Δy.

Modified Example 1.4

Control of the optical axis, that is, control of the height of the cut-off line is not limited to pixel control of the high-definition lamp unit 110 (electronic leveling). For example, an ordinary low beam unit may be structured to be controllable with a high-speed leveling actuator, thus making it possible to control the height of the cut-off line by changing the inclination of the low beam unit (referred to as mechanical leveling). Alternatively, the position of the light emitting element array 112 may be structured to allow mechanical shifting.

Having described the present disclosure with use of specific terms referring to the embodiments, the embodiments merely illustrate the principle and applications of the present disclosure, allowing a variety of modifications and layout change without departing from the spirit of the present disclosure specified by the claims.

What is claimed is:

1. A lamp system for a vehicle, comprising:
 a lamp structured to emit lamp beam with a light distribution containing a cut-off line;
 a sensor provided to detect a dynamic component in a pitch angle of a vehicle body of the vehicle during travel; and
 a controller structured to control the lamp to shift a level of the cut-off line of the light distribution up and down, corresponding to the dynamic component in the pitch angle of the vehicle body detected by the sensor, with reference to a predetermined level,
 wherein an amount of upward shift of the cut-off line is smaller than an amount of downward shift of the cut-off line, per the same change in the pitch angle.

2. The lamp system according to claim 1, wherein the controller applies different control characteristic for upward shift of the cut-off line from the predetermined level, and for downward shift of the cut-off line from the predetermined level.

3. The lamp system according to claim 2, wherein the controller is structured to reduce illuminance in an area above the predetermined level, if the cut-off line resides above the predetermined level.

4. The lamp system according to claim 3, wherein the controller is structured to gradate illuminance in the area above the predetermined level so as to be gradually dimmed upwards, if the cut-off line resides above the predetermined level.

5. The lamp system according to claim 1, wherein the predetermined level is determined with reference to a level on which the cut-off line should fall when the vehicle body stands still.

6. The lamp system according to claim 1, wherein a speed of upward shift of the cut-off line is slower than a speed of downward shift of the cut-off line.

7. The lamp system according to claim 1, wherein the upward shift of the cut-off line is invalidated corresponding to a travel situation.

8. The lamp system according to claim 1, wherein the shift of the cut-off line is invalidated corresponding to a travel situation.

9. The lamp system according to claim 1, wherein
 the lamp is an adaptive driving beam lamp that contains a plurality of individually controllable pixels, and is enabled to control the light distribution corresponding to state of the pixels, and
 the controller is structured to shift a boundary between an on-pixel and an off-pixel from among the pixels up and down.

10. The lamp system according to claim 1, wherein the sensor contains a gyro sensor.

11. A controller that constitutes a lamp system together with a lamp structured to emit lamp beam with a light distribution containing a cut-off line, the controller comprising:
 a correction unit structured to detect a dynamic component in a pitch angle of a vehicle body in response to an output of a sensor, and to shift the level of the cut-off line of the light distribution up and down with reference to a predetermined level, so as to cancel the dynamic component in the pitch angle, wherein an amount of upward shift of the cut-off line is smaller than an amount of downward shift of the cut-off line, per the same change in the pitch angle.

12. A method for controlling a lamp structured to emit lamp beam with a light distribution containing a cut-off line, the method comprising:
 detecting a dynamic component in a pitch angle of a vehicle body during travel; and
 shifting the level of the cut-off line of the light distribution up and down with reference to a predetermined level, corresponding to the dynamic component in the pitch angle of the vehicle body, wherein an amount of upward shift of the cut-off line is smaller than an amount of downward shift of the cut-off line, per the same change in the pitch angle.

* * * * *